(12) United States Patent
Maruya

(10) Patent No.: US 6,404,922 B1
(45) Date of Patent: Jun. 11, 2002

(54) CURVE LENGTH MEASURING DEVICE AND MEASURING METHOD THEREFORE AND STORAGE MEDIUM WHICH STORES CONTROL PROGRAM FOR MEASURING LENGTH OF CURVE

(75) Inventor: Makoto Maruya, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/312,484

(22) Filed: May 17, 1999

(30) Foreign Application Priority Data

May 15, 1998 (JP) .......................................... 10-152288

(51) Int. Cl.[7] ................................................ G06K 9/46
(52) U.S. Cl. ....................... 382/203; 382/190; 382/199; 382/286; 382/300; 345/442
(58) Field of Search ................................. 382/103, 154, 382/195–203; 345/419, 433, 438, 441–443, 468; 702/155

(56) References Cited

U.S. PATENT DOCUMENTS

| 5,638,462 | A | * | 6/1997 | Shirakawa | 382/186 |
| 5,809,170 | A | * | 9/1998 | Saito | 382/203 |
| 5,867,592 | A | * | 2/1999 | Sasada et al. | 382/154 |
| 5,991,702 | A | * | 11/1999 | Saito | 702/155 |
| 6,097,840 | A | * | 8/2000 | Shiitani et al. | 382/203 |

FOREIGN PATENT DOCUMENTS

| JP | 56-127268 | 10/1981 |
| JP | 4-328406 | 11/1992 |
| JP | 5-288513 | 11/1993 |
| JP | 2-179401 | 7/1995 |

* cited by examiner

Primary Examiner—Jose L. Couso
Assistant Examiner—Gregory Desiré
(74) Attorney, Agent, or Firm—Foley & Lardner

(57) ABSTRACT

A curve length measuring device which processes image data obtained by the photographing of an object to be measured to measure a length of an arbitrary curve on a surface of the object to be measured includes a photographing unit for photographing the object to be measured from two or more different viewpoints to obtain a plurality of image data, a measuring point setting unit for setting, on a photographed image, a measuring point sequence along a curve to be measured, a curved surface calculation unit for setting parabolic half-lines directed from a predetermined reference point at a photographing position of the object to be measured by the photographing unit toward each measuring point sequence set by the measuring point setting unit and interpolating a group of half-lines to obtain a curved surface, an intersection calculation unit for obtaining an intersection between the plurality of said curved surfaces obtained by the curved surface calculation unit, and an intersection length calculation unit for obtaining a length of an intersection obtained by the processing by the intersection calculation unit.

6 Claims, 8 Drawing Sheets

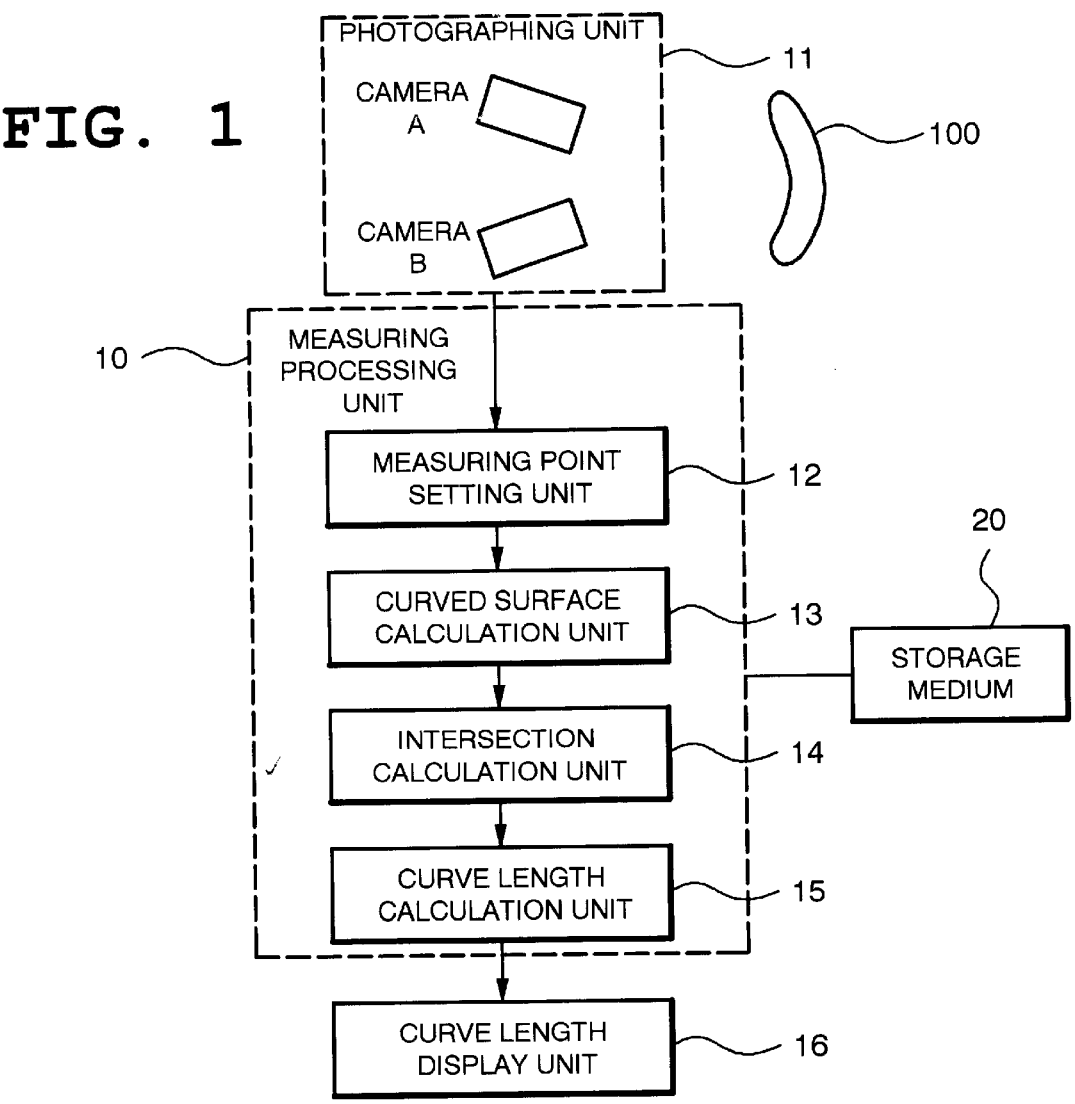
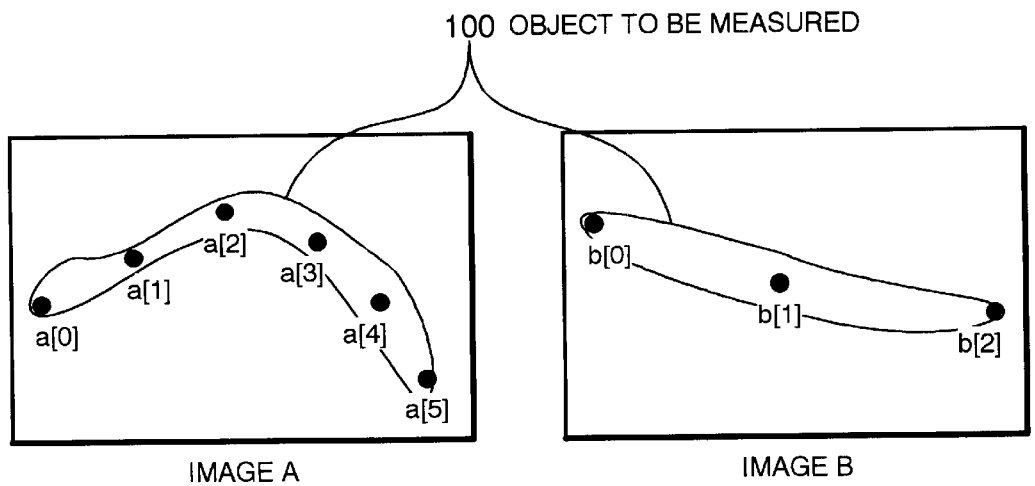

CURVE LENGTH MEASURING DEVICE AND MEASURING METHOD THEREFORE AND STORAGE MEDIUM WHICH STORES CONTROL PROGRAM FOR MEASURING LENGTH OF CURVE

BACKGROUND OF THE INVENTION

1. Field of the Invention

The present invention relates to a curve length measuring device which processes image data obtained by the photographing of an object to be measured to measure a length of an arbitrary curve on a surface of the object to be measured and a measuring method therefor, and a storage medium which stores a control program for measuring a length of such a curve by means of an electronic computer.

2. Description of the Related Art

Among conventional art of this kind for measuring a length of a curve on a surface of an object to be measured are, for example, a technique disclosed in Japanese Patent Laying-Open (Kokai) No. Showa 56-127268, entitled "Image Processing Device", and that disclosed in Japanese Patent Laying-Open (Kokai) No. Heisei 4-328406, entitled "Image Measuring Device". The techniques recited in Japanese Patent Laying-Open (Kokai) No. Showa 56-127268 and No. Heisei 4-328406 both trace a curve set in an image to measure and output a length of the curve.

Of the above-described conventional art, the device disclosed in Japanese Patent Laying-Open (Kokai) No. Heisei 4-328406 includes, as illustrated in FIG. 9, an image accumulation unit 91, an image display unit 92, an image input unit 93, a coordinate accumulation unit 94, a sort unit 95, an analysis unit 96 and a data accumulation unit 97. The image accumulation unit 91 stores image data obtained by the photographing of an object to be measured. The image display unit 92 displays an image based on image data stored at the image accumulation unit 91. The coordinate input unit 93 receives input of coordinates of a predetermined point on a curve in a displayed image. The coordinate accumulation unit 94 stores applied coordinates of each point on a curve. The sort unit 95 rearranges coordinates of each point stored in the coordinate accumulation unit 94 based on predetermined rules. More specifically, the unit 95 repeats processing of linking points located closest to each other to generate a segment and then linking end points of the generated segments. When generated segments are connected to have one curve, the unit 95 regards the order of the points on the curve in question as the order of coordinates. The analysis unit 96 calculates a length of the curve in question based on the rearranged coordinates. The data accumulation unit 97 stores calculation results.

As described in the foregoing, operability can be improved because rearrangement of input coordinates by the sort unit 95 enables points on a curve to be input in an arbitrary order. A further characteristic is that since the sort unit 95 rearranges coordinates by simple processing, a curve length can be calculated in a short time.

As described above, the conventional curve length measuring techniques recited in the above literature are for processing image data of an object to be measured to calculate a length of a desired curve and both techniques use single image data of an object to be measured as an object to be processed. Therefore, a length of a curve to be measured varies depending on a positional relationship between an object to be measured and a photographing device (camera) at the time of the photographing of the object to be measured. For example, even with the same curve on a surface of an object to be measured, an apparent length of the curve is shorter by the photographing far from the object than by the photographing close to the object. An apparent length of a curve also depends on a direction of the object to be measured against the photographing device at the time of the photographing of the object to be measured. As a result, the obtained curve length does not always reflect a length of a corresponding curve of an actual object to be measured.

As described in the foregoing, conventional curve length measuring techniques have a drawback that a length of a curve on an image varies depending on a positional relationship between an object to be measured and a photographing device because a curve length is calculated with single image data of the object to be measured as an object to be processed. The drawback of the conventional techniques is conspicuous when calculation is made of a length of a complicated curve on a surface of an object to be measured which has a three-dimensional shape.

SUMMARY OF THE INVENTION

An object of the present invention is to provide a curve length measuring device capable of accurately measuring a length of a desired curve on a surface of an object to be measured independently of a positional relationship between the object to be measured and a photographing device such as a distance between the object to be measured and the photographing device and a direction of the object to be measured against the photographing device and a measuring method therefor, and a storage medium which stores a control program for measuring a length of a curve.

According to the first aspect of the invention, a curve length measuring device which processes image data obtained by the photographing of an object to be measured to measure a length of an arbitrary curve on a surface of the object to be measured, comprises photographing means for photographing the object to be measured from two or more different viewpoints to obtain a plurality of image data, measuring point setting means for setting, on the image photographed by the photographing means, a measuring point sequence along a curve to be measured, curved surface calculating means for setting parabolic half-lines directed from a predetermined reference point at a photographing position of the object to be measured by the photographing means toward each the measuring point sequence set by the measuring point setting means and interpolating a group of half-lines to obtain a curved surface, intersection calculating means for obtaining an intersection of the plurality of the curved surfaces obtained by the curved surface calculating means, and intersection length calculating means for obtaining a length of the intersection obtained by the processing by the intersection calculating means.

In the preferred construction, the curve length measuring device further comprises intersection length displaying means for displaying a length of the intersection obtained by the processing by the intersection calculating means on a display device.

In another preferred construction, the intersection calculating means determines an intersection and generates points of intersection between the half-line and the curved surface in order, starting with the half-line at one edge of the curved surface and ending with the half-line at the other edge.

In another preferred construction, in a case where two kinds of image data of the object to be measured is obtained from different viewpoints by the photographing means, when a predetermined point of intersection is made by an intersection between a predetermined one of the half-lines extending from the reference point of the photographing means at the time of acquisition of first the image data and a predetermined partial curved surface which is a part divided by the half-lines adjacent to each other among the curved surfaces obtained by the interpolation of the half-lines extending from the reference point of the photographing device at the time of acquisition of second the image data, the intersection calculating means, as the processing of obtaining a point of intersection subsequent to the intersection point in question, determines whether, among the half-lines corresponding to first the image data, a half-line subsequent to the predetermined half-line intersects with the predetermined partial curved surface, when the half-line intersects with the predetermined partial curved surface, regards the point of intersection in question as an intersection point, when the half-line fails to intersect with the predetermined partial curved surface, determines whether among the half-lines corresponding to second the image data and out of the half-lines forming the predetermined partial curved surface, the half-line whose order of the intersection determination and intersection point generation processing is lower intersects with a partial curved surface formed by the predetermined half-line and the subsequent one of the half-lines among the curved surfaces obtained by the interpolation of the half-lines extending from the reference point of the photographing device at the time of acquisition of first the image data, and when the half-line intersects with the partial curved surface, regards the point of intersection in question as an intersection point.

In another preferred construction, in a case where two kinds of image data of the object to be measured is obtained from different viewpoints by the photographing means, when a predetermined point of intersection is made by an intersection between a predetermined one of the half-lines extending from the reference point of the photographing means at the time of acquisition of first the image data and a predetermined partial curved surface which is a part divided by the half-lines adjacent to each other among the curved surfaces obtained by the interpolation of the half-lines extending from the reference point of the photographing device at the time of acquisition of second the image data, the intersection calculating means, as the processing of obtaining a point of intersection subsequent to the intersection point in question, determines whether, among the half-lines corresponding to first the image data, a half-line subsequent to the predetermined half-line intersects with the predetermined partial curved surface, when the half-line intersects with the predetermined partial curved surface, regards the point of intersection in question as an intersection point, when the half-line fails to intersect with the predetermined partial curved surface, determines whether among the half-lines corresponding to second the image data and out of the half-lines forming the predetermined partial curved surface, the half-line whose order of the intersection determination and intersection point generation processing is lower intersects with a partial curved surface formed by the predetermined half-line and the subsequent one of the half-lines among the curved surfaces obtained by the interpolation of the half-lines extending from the reference point of the photographing device at the time of acquisition of first the image data, when the half-line intersects with the partial curved surface, regards the point of intersection in question as an intersection point, repeatedly executes each of the foregoing processing until reaching the half-line at the other edge of the curved surface, and links an obtained sequence of intersection points to generate an intersection after reaching the half-line at the other edge of the curved surface.

According to the second aspect of the invention, a curve length measuring method of processing image data obtained by the photographing of an object to be measured to measure a length of an arbitrary curve on a surface of the object to be measured, comprising the steps of photographing the object to be measured from two or more different viewpoints to obtain a plurality of image data, setting, on the image photographed, a measuring point sequence along a curve to be measured, setting parabolic half-lines directed from a predetermined reference point at a photographing position of the image of the object to be measured toward each the measuring point sequence, interpolating the group of half-lines to obtain a curved surface, obtaining an intersection of the obtained plurality of the curved surfaces, and obtaining a length of the intersection obtained.

In the preferred construction, the intersection obtaining step further comprises the step of determining an intersection and generating points of intersection between the half-line and the curved surface in order, starting with the half-line at one edge of the curved surface and ending with the half-line at the other edge.

In another preferred construction, in a case of obtaining two kinds of image data of the object to be measured from different viewpoints, when a predetermined point of intersection is made by an intersection between a predetermined one of the half-lines extending from the reference point of the photographing means at the time of acquisition of first the image data and a predetermined partial curved surface which is a part divided by the half-lines adjacent to each other among the curved surfaces obtained by the interpolation of the half-lines extending from the reference point of the photographing position at the time of acquisition of second the image data, the intersection obtaining step further comprises the steps of, as the processing of obtaining a point of intersection subsequent to the intersection point in question:

determining whether, among the half-lines corresponding to first the image data, the half-line subsequent to the predetermined half-line intersects with the predetermined partial curved surface, when the half-line intersects with the predetermined partial curved surface, regarding the point of intersection in question as an intersection point, when the half-line fails to intersect with the predetermined partial curved surface, determining whether among the half-lines corresponding to second the image data and out of the half-lines forming the predetermined partial curved surface, the half-line whose order of the intersection determination and intersection point generation processing is lower intersects with a partial curved surface formed by the predetermined half-line and the subsequent one of the half-lines among the curved surfaces obtained by the interpolation of the half-lines extending from the reference point of the photographing position at the time of acquisition of first the image data, and when the half-line intersects with the partial curved surface, regarding the point of intersection in question as an intersection point.

In another preferred construction, in a case of obtaining two kinds of image data of the object to be measured from different viewpoints, when a predetermined point of intersection is made by an intersection between a predetermined one of the half-lines extending from the reference point of the photographing means at the time of acquisition of first the image data and a predetermined partial curved surface which is a part divided by the half-lines adjacent to each other among the curved surfaces obtained by the interpolation of the half-lines extending from the reference point of the photographing position at the time of acquisition of second the image data, the intersection obtaining step further comprises the steps of, as the processing of obtaining a point of intersection subsequent to the intersection point in question:

determining whether, among the half-lines corresponding to first the image data, the half-line subsequent to the predetermined half-line intersects with the predetermined partial curved surface, when the half-line intersects with the predetermined partial curved surface, regarding the point of intersection in question as an intersection point, when the half-line fails to intersect with the predetermined partial curved surface, determining whether among the half-lines corresponding to second the image data and out of the half-lines forming the predetermined partial curved surface, the half-line whose order of the intersection determination and intersection point generation processing is lower intersects with a partial curved surface formed by the predetermined half-line and the subsequent one of the half-lines among the curved surfaces obtained by the interpolation of the half-lines extending from the reference point of the photographing position at the time of acquisition of first the image data, when the half-line intersects with the partial curved surface, regarding the point of intersection in question as an intersection point, repeatedly executing each of the foregoing processing until reaching the half-line at the other edge of the curved surface, and linking an obtained sequence of intersection points to generate an intersection after reaching the half-line at the other edge of the curved surface.

According to another aspect of the invention, a computer readable memory storing a control program for controlling a data processing device to process image data obtained by the photographing of an object to be measured and measure a length of an arbitrary curve on a surface of the object to be measured, the control program comprises the steps of photographing the object to be measured from two or more different viewpoints to obtain a plurality of image data, setting, on the image photographed, a measuring point sequence along a curve to be measured, setting parabolic half-lines directed from a predetermined reference point at a photographing position of the image of the object to be measured toward each the measuring point sequence, interpolating the group of half-lines to obtain a curved surface, obtaining an intersection of the obtained plurality of the curved surfaces, and obtaining a length of the intersection obtained.

Other objects, features and advantages of the present invention will become clear from the detailed description given herebelow.

BRIEF DESCRIPTION OF THE DRAWINGS

The present invention will be understood more fully from the detailed description given herebelow and from the accompanying drawings of the preferred embodiment of the invention, which, however, should not be taken to be limitative to the invention, but are for explanation and understanding only.

In the drawings:

FIG. 1 is a block diagram showing structure of a curve length measuring device according to one embodiment of the present invention;

FIG. 2 is a schematic diagram showing an example of an image obtained by a photographing unit of the present embodiment;

DESCRIPTION OF THE PREFERRED EMBODIMENT

Figure 3:
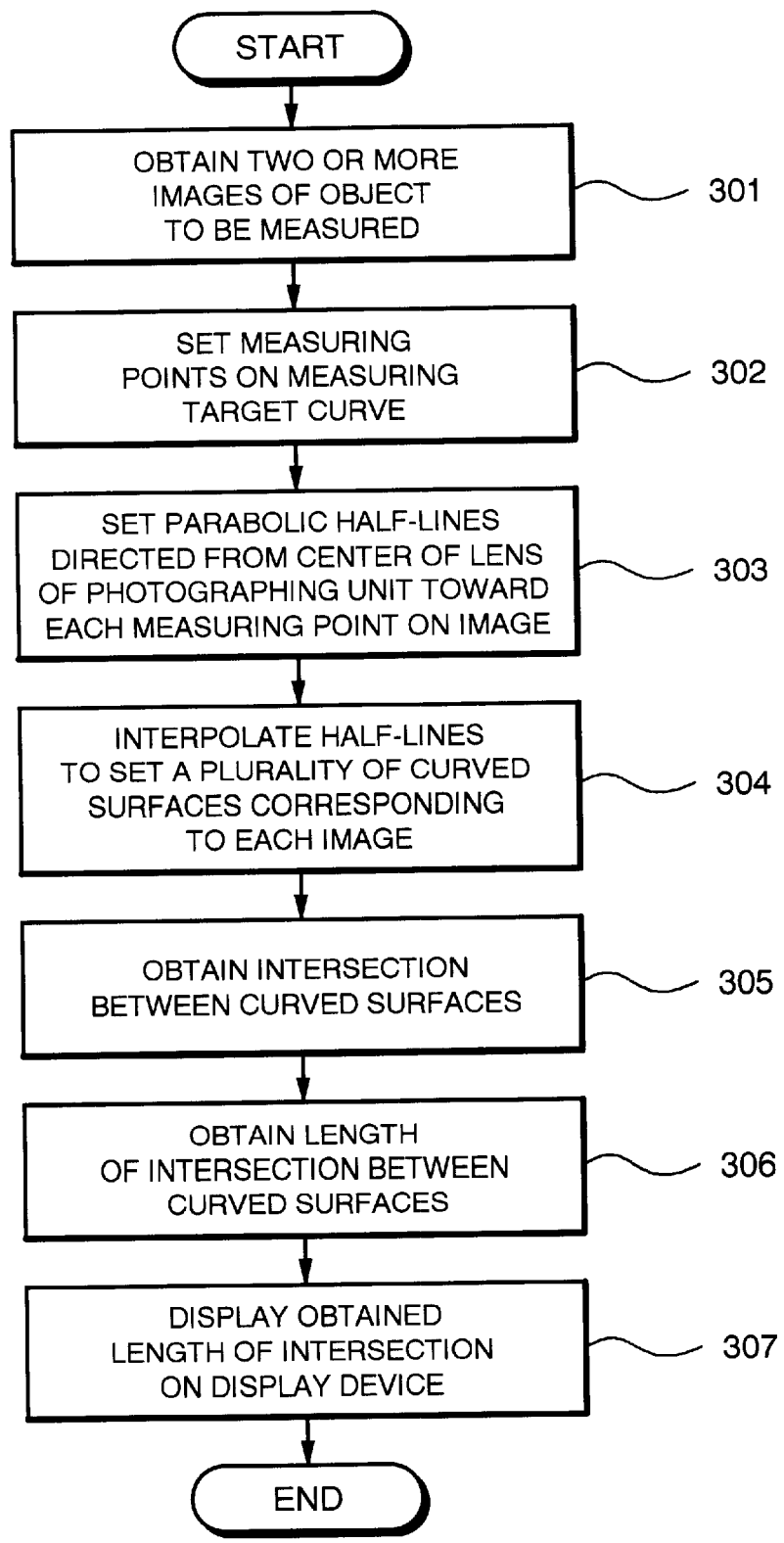
FIG. 3 is a flow chart showing operation of the present embodiment.

The preferred embodiment of the present invention will be discussed hereinafter in detail with reference to the accompanying drawings. In the following description, numerous specific details are set forth in order to provide a thorough understanding of the present invention. It will be obvious, however, to those skilled in the art that the present invention may be practiced without these specific details. In other instance, well-known structures are not shown in detail in order to unnecessary obscure the present invention.

FIG. 1 is a block diagram showing structure of a curve length measuring device according to one embodiment of the present invention. With reference to FIG. 1, the curve length measuring device of the present embodiment includes a photographing unit 11 for photographing an object to obtain a plurality of image data, a measuring processing unit 10 for measuring a length of an arbitrary curve on a surface of the object to be measured and a curve length display unit 16 for displaying an obtained curve length.

Then, the measuring processing unit 10 includes a measuring point setting unit 12 for setting a measuring point on a curve to be measured on an image photographed by the photographing unit 11, a curved surface calculation unit 13 for obtaining a curved surface passing through a predetermined measuring point on an image and a predetermined point at a photographing position at which the photographing unit 11 obtains the image of the object 100 to be measured, an intersection calculation unit 14 for obtaining an intersection of curved surface obtained for each image data, and a curve length calculation unit 15 for obtaining a length of a curve which is an obtained intersection. In FIG. 1, illustration is made only of a characteristic part of the structure of the present embodiment and that of the remaining common part is omitted.

In the above-described structure, the measuring point setting unit 12, the curved surface calculation unit 13, the intersection calculation unit 14 and the curve length calculation unit 15 are realized, for example, by program-controlled CPU and internal memory in a workstation, a personal computer or other data processing device. In this case, the computer program which controls the CPU is provided as storage in a storage medium 20 shown in FIG. 1 and is loaded into the internal memory to execute functions of the above-described function execution units. As the storage medium 20, a magnetic disk, an optical disk, a semiconductor memory or other common storage medium can be employed. The photographing unit 11 is realized by a camera for photographing an object 100 to be measured and an image data generation means for converting photographed image into digital data (hereinafter, referred to as image data) and outputting the data. Connecting a CCD (charge coupled device) to the camera enables image photographed by the camera to be directly obtained as image data.

In the respective components of the present embodiment, the photographing unit 11 photographs the object 100 to be measured from at least two directions. In this case, photographing may be conducted using two or more cameras or may be conducted twice or more with the object 100 to be measured rotating, or may be conducted twice or more with a camera moving. In the following, description will be made assuming that two cameras (camera A and camera B) are used to photograph the object 100 to be measured from two directions for the purpose of simplicity. An image photographed by the camera A will be referred to as an image A and digitized image data as image data A, while an image photographed by the camera B will be referred to as an image B and digitized image data as image data B. A relative positional relationship between the camera A and the camera B is obtained in advance.

The measuring point setting unit 12 sets measuring points $a[0], a[1], a[2], \ldots a[imax]$ ($imax \geq 1$) in order along a curve in the measuring target object 100 whose length is to be measured in the image A. Similarly, the unit 12 sets measuring points $b[0], b[1], b[2], \ldots b[jmax]$ ($jmax \geq 1$) in order along a curve in the measuring target object 100 whose length is to be measured in the image B. Shown in FIG. 2 are cases where imax=5 and jmax=2. Such setting of measuring points as illustrated in FIG. 2 may be manually executed by a person while watching an image displayed on a display device or may be automatically executed by an image processing technique such as edge detection or fine-lining. These techniques are recited, for example, in the literature "Image Processing Handbook" (Image Processing Handbook Editorial Committee, Shokei-do, published in 1987).

The curved surface calculation unit 13 sets a parabolic half-line directed from the center of a camera lens of the photographing unit 11 toward each measuring point on an image and interpolates a group of these half-lines to obtain a curved surface. More specifically, with a half-line directed from the center of the lens of the camera A toward a point $a[i]$ on the photographing plane of the camera A as $p[i]$ and a half-line directed from the center of the lens of the camera B toward the point $b[j]$ on the photographing plane of the camera B as $q[j]$, the unit 13 generates a curved surface which interpolates a group of half-lines $p[i]$ ($1 \leq i \leq imax$). Similarly, the unit 13 generates a curved surface which interpolates a group of half-lines $q[j]$ ($1 \leq j \leq jmax$). Setting a density of measuring points to be high enough will result in that a curved surface obtained by the foregoing processing substantially contains a target curve whose length is to be measured (hereinafter referred to as a measuring target curve).

The intersection calculation unit 14 obtains an intersection between curved surfaces respectively obtained in the two images A and B. Three-dimensional structure of thus obtained intersection between the curved surfaces can be regarded as being substantially coincident with that of the measuring target curve. As a technique of obtaining an intersection between curved surfaces intersecting with each other, various methods can be employed which have been conventionally used in image processing of this kind.

The curve length calculation unit 15 obtains a length of the intersection between two curved surfaces obtained by the intersection calculation unit 14, that is, a length of the measuring target curve. In this case, since the three-dimensional structure of the intersection between curved surfaces in question is known, a precise length of the measuring target curve can be obtained which is independent of a positional relationship between the camera and the measuring target curve. As a curve length calculation technique, such common methods of obtaining a length of a curve on an image as described in the Related Art can be employed.

The curve length display unit 16 displays calculation results obtained by the curve length calculation unit 15 on a CRT monitor, a liquid crystal display or other display device.

Next, operation of the present embodiment will be described with reference to the flow chart of FIG. 3. With reference to FIG. 3, in the curve length measuring device of the present embodiment, first, photograph the object 100 to be measured to obtain two or more images by the photographing unit 11 (Step 301). As described above, a relative positional relationship between cameras of the photographing unit 11 at the time of acquisition of each image is predetermined.

Next, set an appropriate number of measuring points on a measuring target curve whose length is to be measured in each obtained image by the measuring point setting unit 12

(Step 302). As described above, although the higher a density of measuring points is, that is, the larger the number of measuring points is, the higher the obtained measuring precision can be, the increase in the number of measuring points accordingly requires more calculation time. Therefore, an appropriate number of measuring points is determined in consideration of performance of the device (operation speed), an object of measurement, etc.

Next, set parabolic half-lines directed from the center of the camera lens of the photographing unit 11 toward each measuring point on the image (Step 303) and interpolate the half-lines to set a curved surface by the curved surface calculation unit 13 (Step 304). Then, obtain an intersection of the curved surfaces obtained with respect to each image by the intersection calculation unit 14 (Step 305). Next, obtain a length of the intersection of the curved surfaces in question by the curve length calculation unit 15 (Step 306). Lastly, display the obtained length of intersection on the display device (Step 307).

Although the above-described embodiment assumes that as a technique of obtaining an intersection of curved surfaces, various methods conventionally used in image processing of this kind can be employed and specifies no method, processing of obtaining an intersection of curved surfaces can be efficiently conducted by devising the relevant techniques. Next, operation of the intersection calculation means will be described in detail.

Here, assume that in a curved surface containing two half-lines p[i−1] and p[i], a region, in particular, sandwiched between p[i−1] and p[i] is a partial curved surface R[i] (1≦i≦imax−1) and similarly that in a curved surface containing straight lines q[j−1] and q[j], a region, in particular, sandwiched between q[j−1] and q[j] is a partial curved surface S[j] (1≦j≦jmax−1). The partial curved surfaces R[i] and S[j] may be plane surfaces and in that case, calculation of a point of intersection will be easy. In the following, a set of partial curved surfaces R[i] (1≦i≦imax−1) is referred to as a curved surface R and a set of partial curved surfaces S[j] (i≦j≦imax−1) is referred to as a curved surface S. In the present embodiment, the intersection calculation unit 14 obtains an intersection between the curved surface R and the curved surface S by the operation described below.

Figure 4:
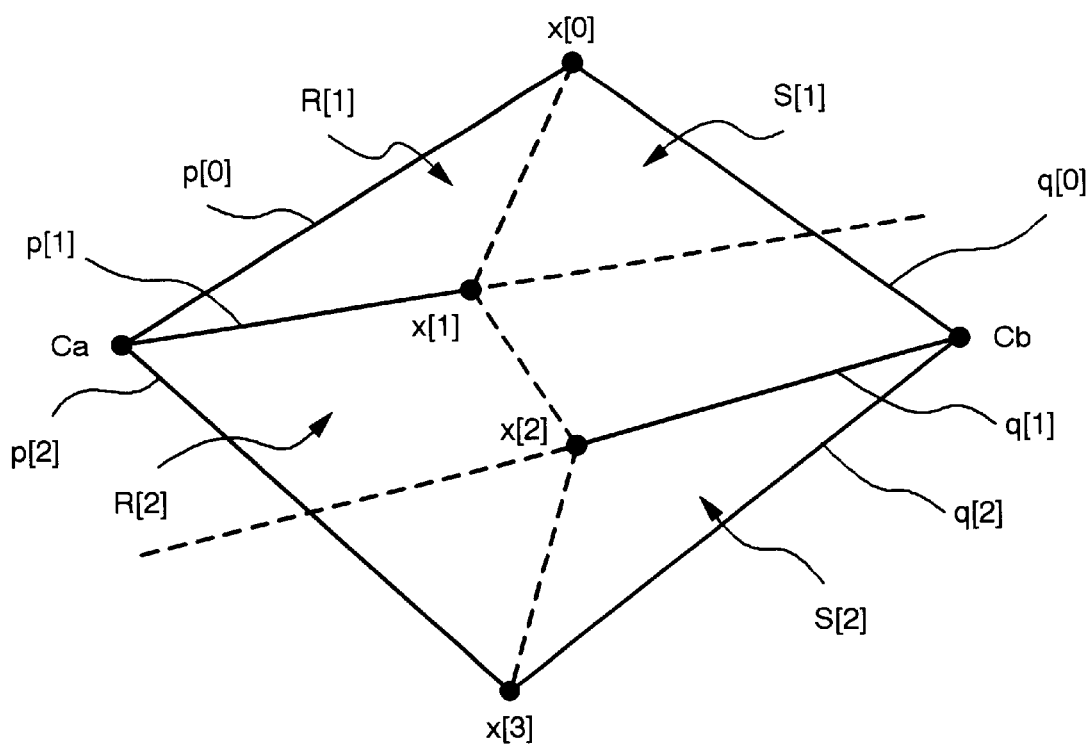
FIG. 4 is a schematic diagram for use in explaining processing of estimating three-dimensional structure of a curve to be measured in the present embodiment.

FIG. 4 is a schematic diagram for use in explaining a method of calculating an intersection by the intersection calculation unit 14 of the present embodiment. With reference to FIG. 4, three half-lines p[0], p[1] and p[2] extend from the center Ca of the lens of the camera A and two partial curved surfaces R[1] and R[2] exist between the respective half-lines. Similarly, three half-lines q[0], q[1] and q[2] extend from the center Cb of the lens of the camera B and two partial curved surfaces S[1] and S[2] exist between the respective half-lines. In this arrangement, the half-line p[1], for example, intersects with either the partial curved surface S[1] or S[2] in one case and intersects with neither of them in the other case. Examining such possibility of every half-line involves increase in a time required for the processing to deteriorate efficiency, in particular, when the number of measuring points is large. Therefore, the processing is reduced by the following manner to improve processing efficiency.

In the example shown in FIG. 4, obtain points of intersection in the order, x[0], x[1], x[2] and x[3] and link the intersection points to generate an intersection. Description will be here made of a case where with the intersection points x[0] and x[1] obtained, the intersection point x[2] is obtained next. The intersection point x[1] is an A-type intersection point made by the half-line p[1] and the partial curved surface S[1] intersecting with each other. Points having a possibility of becoming an point of intersection adjacent to the intersection point x[1] are a point of intersection between the half-line p[2] and the partial curved surface S[1] and a point of intersection between the partial curved surface R[2] and the half-line q[1]. These two intersection points never exist at the same time. When the half-line p[2] and the partial curved surface S[1] intersect with each other, the partial curved surface R[2] and the half-line q[1] never intersect with each other. Similarly, when the partial curved surface R[2] and the half-line q[1] intersect with each other, the half-line p[2] and the partial curved surface S[1] never intersect with each other. Therefore, if making examination of either one of the cases finds an intersection, examination in the other case will be unnecessary to reduce the amount of processing. In the case of FIG. 4, since the partial curved surface R[2] and the half-line q[1] intersect with each other, if such a situation is known, it is unnecessary to check an intersection between the half-line p[2] and the partial curved surface S[1].

Figure 5:
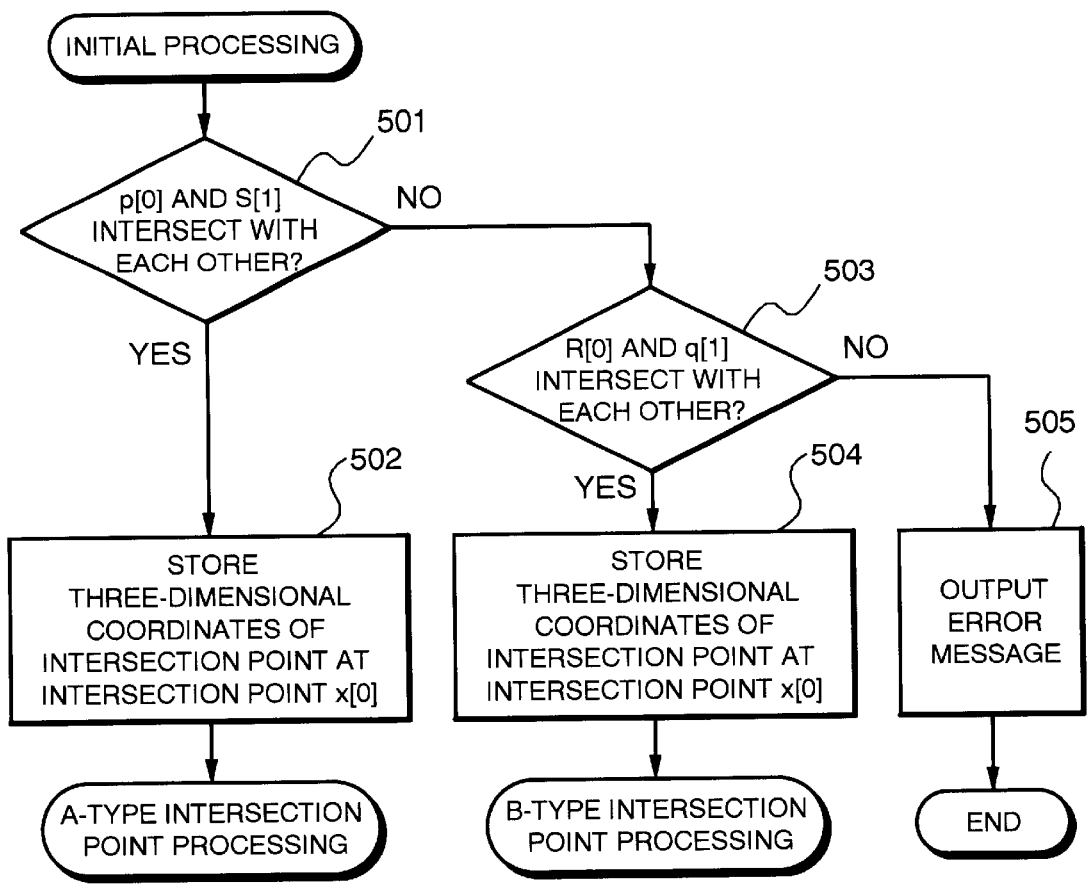
FIG. 5 is a flow chart showing operation conducted by an intersection calculation unit of the present embodiment, which is a diagram showing initial processing.
Figure 6:
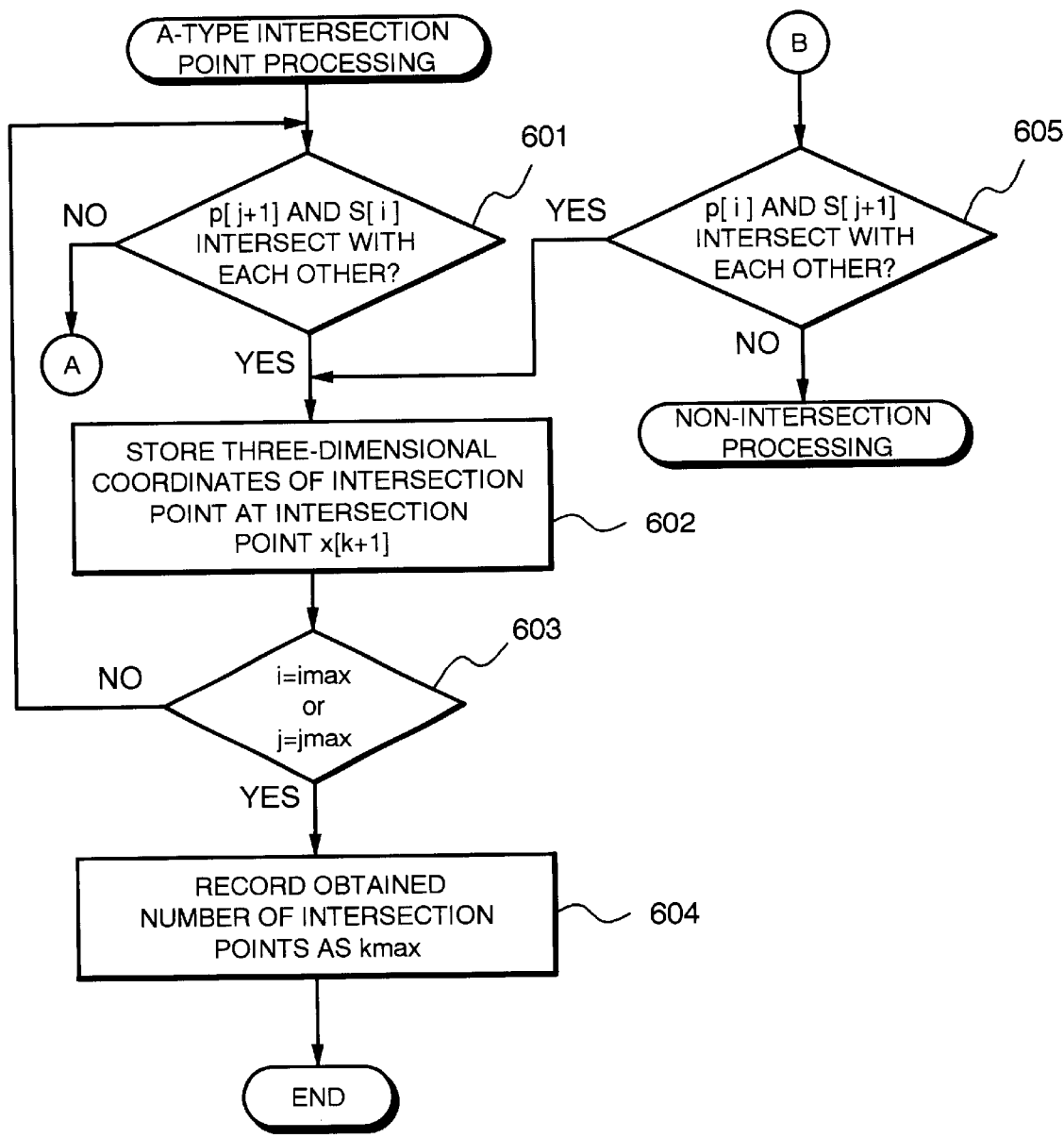
FIG. 6 is a flow chart showing operation conducted by the intersection calculation unit of the present embodiment, which is a diagram showing A-type intersection point processing.
Figure 7:
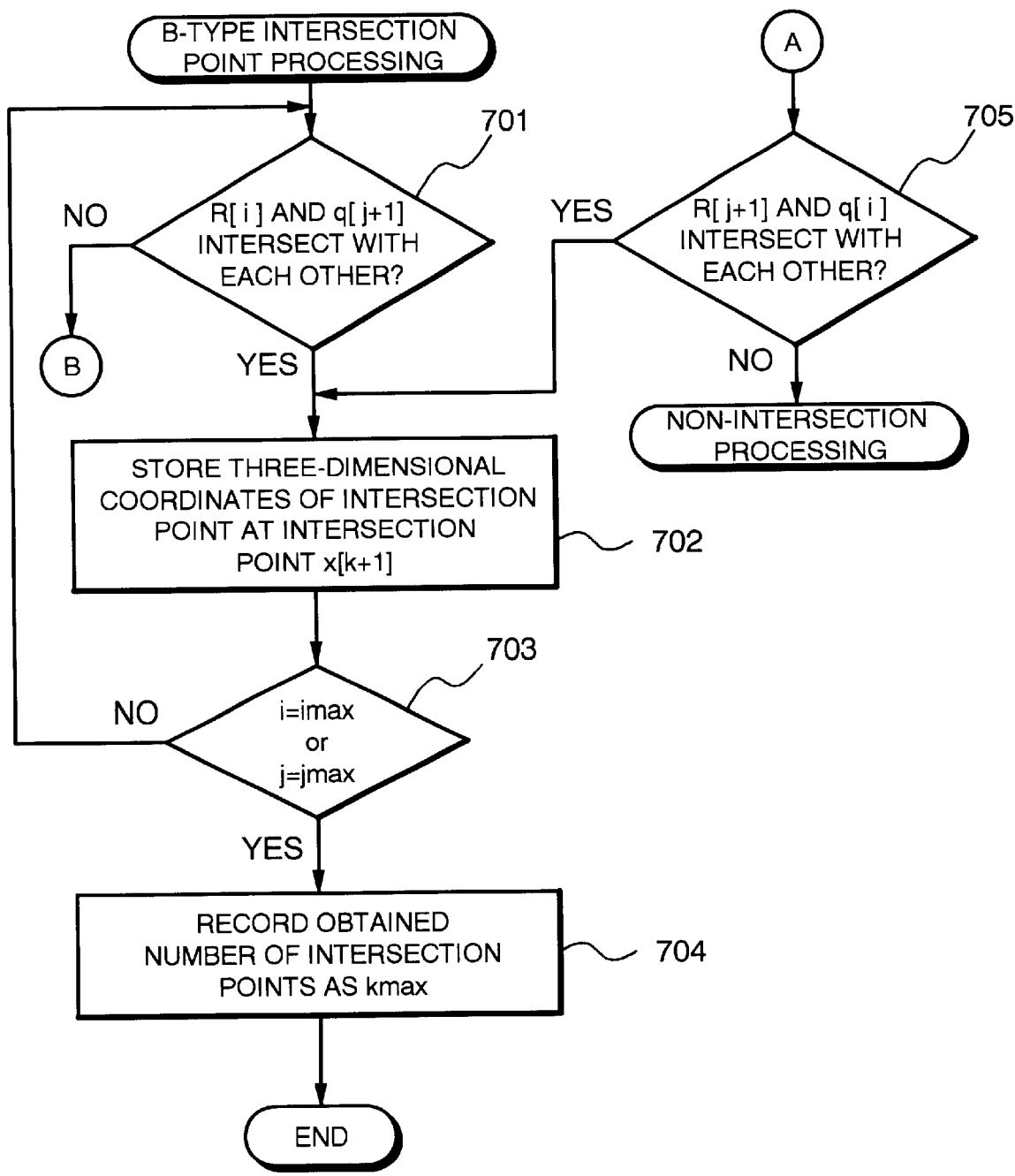
FIG. 7 is a flow chart showing operation conducted by the intersection calculation unit of the present embodiment, which is a diagram showing B-type intersection point processing.
Figure 8:
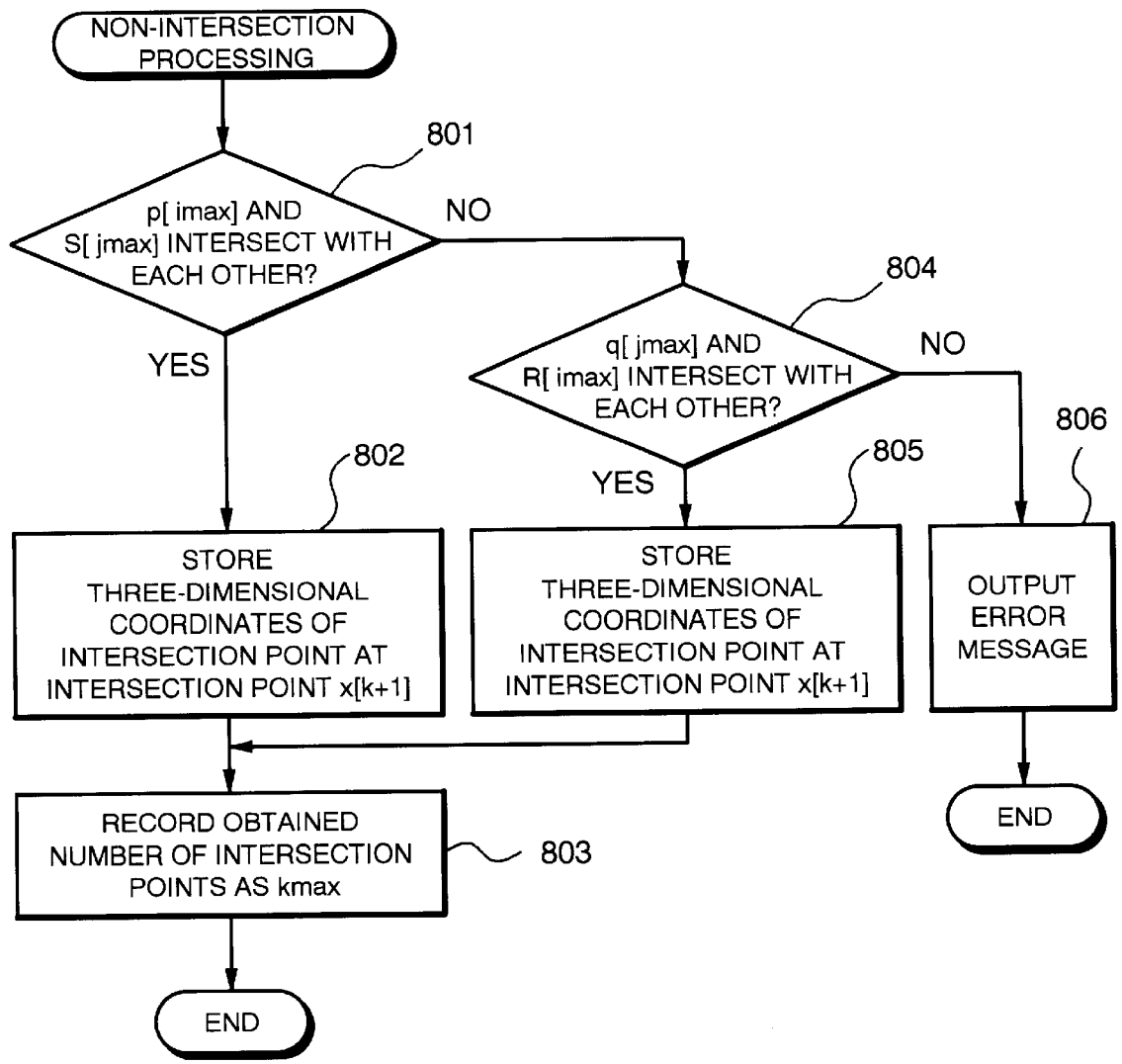
FIG. 8 is a flow chart showing operation conducted by the intersection calculation unit of the present embodiment, which is a diagram showing non-intersection processing.
Figure 9:
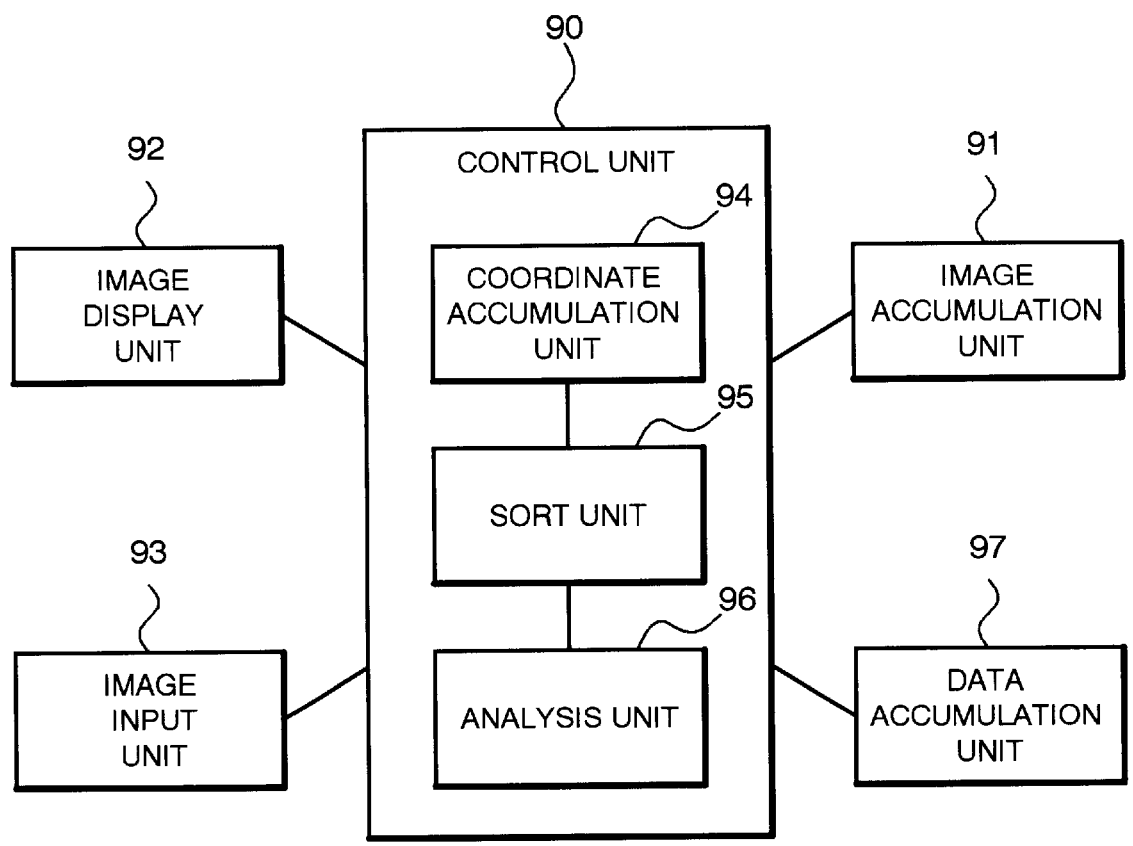
FIG. 9 is a block diagram showing structure of a conventional curve length measuring device.

Next, operation of the intersection calculation unit 14 will be described in detail with reference to the flow charts of FIGS. 5 to 8. In the following description, a point of intersection between a straight line p and a curved surface S is referred to as an A-type intersection point and a point of intersection between a straight line q and a curved surface R as a B-type intersection point. With reference to FIG. 5, operation of the intersection calculation unit 15 is roughly composed of four processing, initial processing (FIG. 5), A-type intersection point processing (FIG. 6), B-type intersection point processing (FIG. 7) and non-intersection processing (FIG. 8). When the routine proceeds to the processing of the intersection calculation unit 14 after a predetermined curved surface is set by the curved surface calculation unit 13, the intersection calculation unit 14 first executes the initial processing.

In the initial processing shown in FIG. 5, the intersection calculation unit 14 first determines whether the half-line p[0] and the partial curved surface S[1] intersect with each other or not (Step 501) and when they intersect with each other, stores three-dimensional coordinates of the intersection point in question at the intersection point x[0] (Step 502) to proceed to the A-type intersection point processing. On the other hand, when the half-line p[0] and the partial curved surface S[1] fail to intersect with each other, the unit 14 determines whether the partial curved surface R[0] and the half-line q[1] intersect with each other (Step 503) and when they intersect with each other, stores three-dimensional coordinates of the intersection point in question at an intersection point x[0] (Step 504) to proceed to the B-type intersection point processing. If either of the above-described intersection points exists, output an error message to urge a user to reset measuring points and complete the processing (Step 505).

Next, the A-type intersection point processing shown in FIG. 6 will be described. Here, assume that a point of intersection between a partial curved surface S[i] as a part of a curved surface and a straight half-line p[j] is an intersection point x[k]. When the routine proceeds from Step 502 of FIG. 5 to the A-type intersection point processing, first, determine whether a half-line p[j+1] and a partial curved surface S[i] intersect with each other (Step 601). When they intersect with each other, store coordinates of the intersection point in question at an intersection point x[k+1] (Step 602). On the other hand, when the half-line p[j+1] and the partial curved surface S[i] fail to intersect with each other, the routine proceeds to Step 705 of the B-type intersection point processing which will be described later.

Next, determine whether the intersection point generation processing reaches the edge of the curved surface set by the curved surface calculation unit 13, that is, whether i=imax or j=jmax is established (Step 603). Then, when the intersection point generation processing is yet to reach the edge of the curved surface (in a case where neither i=imax nor j=jmax), the routine returns to Step 601 to make determination of the next intersection point. On the other hand, when the intersection point generation processing reaches the edge of the curved surface (in a case where i=imax or j=jmax), record the obtained number of intersection points as kmax (Step 604) to complete the processing.

At Step 701 of the B-type intersection point processing which will be described later, when the half-line q[j+1] and the partial curved surface R[i] fail to intersect with each other, next determine whether the half-line p[i] and the partial curved surface S[j+1] intersect with each other (Step 605). When they intersect with each other, store coordinates of the intersection point in question at the intersection point x[k+1] (Step 602). On the other hand, when they fail to intersect with each other, proceed to the non-intersection processing. Processing at Step 602 and the following steps is as described above.

Next, B-type intersection point processing shown in FIG. 7 will be described. Here, assume that a point of intersection between the partial curved surface R[i] which is a part of the curved surface and the straight half-line q[j] is the point x[k]. When the routine proceeds from Step 504 of FIG. 5 to the B-type intersection point processing, first determine whether the half-line q[j+1] and the partial curved surface R[i] intersect with each other or not (Step 701). When they intersect with each other, store coordinates of the intersection point in question at the intersection point x[k+1] (Step 702). On the other hand, when the half-line q[j+1] and the partial curved surface R[i] fail to intersect with each other, the routine proceeds to Step 605 of the above-described A-type intersection point processing.

Next, determine whether the intersection point generation processing reaches the edge of the curved surface set by the curved surface calculation unit 13, that is, whether i=imax or j=jmax (Step 703). Then, when the intersection point generation processing is yet to reach the edge of the curved surface (in a case where neither i=imax nor j=jmax), the routine returns to Step 701 to make determination of the next intersection point. On the other hand, when the intersection point generation processing reaches the edge of the curved surface (in a case where i=imax or j=jmax), record the obtained number of intersection points as kmax (Step 704) to complete the processing.

In addition, at the above-described Step 601 of the A-type intersection point processing, when the half-line p[j+1] and the partial curved surface S[i] fail to intersect with each other, next determine whether the half-line q[i] and the partial curved surface R[j+1] intersect with each other (Step 705). When they intersect with each other, store coordinates of the intersection point in question at the intersection point x[k+1] (Step 702). On the other hand, when they fail to intersect with each other, proceed to the non-intersection processing. Processing at Step 702 and the following steps is as described above.

Next, non-intersection processing shown in FIG. 8 will be described. Non-intersection processing is the processing, which is executed when there occurs a case where an intersection point can not be traced in the course of the intersection calculation processing, for finding a point of intersection at an edge part on the side where the processing starts and a point of intersection at an edge part on the opposite side. More specifically, determine whether the half-line p[imax] and the partial curved surface S[jmax] intersect with each other or not (Step 801) and when they intersect with each other, store coordinates of the intersection point in question at the intersection point x[k+1] (Step 802). Then, record the obtained number of intersection points as kmax (Step 803) to complete the processing. On the other hand, when the half-line p[imax] and the partial curved surface S[jmax] fail to intersect with each other, subsequently determine whether the half-line q[jmax] and the partial curved surface R[imax] intersect with each other (Step 804) and when they intersect with each other, store coordinates of the intersection point in question at the intersection point x[k+1] (Step 805). Then, record the obtained number of intersection points as kmax (Step 803) to complete the processing. When neither the half-line p[imax] and the partial curved surface S[jmax] nor the partial curved surface R[imax] and the half-line q[jmax] intersect with each other, output an error message to urge a user to reset measuring points and complete the processing (Step 806).

After the intersection calculation processing is completed by the intersection calculation unit 14 in a manner as described above, the intersection length calculation unit 15 calculates a length of an intersection point sequence x[k] (1≦k≦kmax).

$$\text{curve length} = \sum_{k=1}^{k_{\max}-1} |x[k+1] - x[k]|$$

where |x[k+1]−x[k]| represents a distance between x[k+1] and x[k].

As described in the foregoing, the curve length measuring device and the measuring method therefor, and the storage medium which stores a control program for measuring a length of a curve according to the present invention photograph an object to be measured from a plurality of viewpoints and estimate three-dimensional structure of the curve as a measuring target based on image information obtained from the respective viewpoints to obtain a length of the curve in question. Therefore, accurate curve length measurement can be attained independently of positional relationships between an object to be measured and a photographing device such as a distance between a measuring target and a photographing device which photographs the measuring target and a direction of the measuring target against the photographing device.

Another effect is reducing a time required for processing to improve processing efficiency by, in the processing of estimating three-dimensional structure of a curve as an object to be measured, suitably reducing the processing of calculating a coordinate value indicative of the three-dimensional structure of the curve based on positional relationships between a photographing device and an object to be measured.

Although the invention has been illustrated and described with respect to exemplary embodiment thereof, it should be understood by those skilled in the art that the foregoing and various other changes, omissions and additions may be made therein and thereto, without departing from the spirit and scope of the present invention. Therefore, the present invention should not be understood as limited to the specific embodiment set out above but to include all possible embodiments which can be embodies within a scope encompassed and equivalents thereof with respect to the feature set out in the appended claims.

What is claimed is:

1. A curve length measuring device for processing image data obtained by photographing an object to be measured to measure a length of an arbitrary curve on a surface of the object to be measured, comprising:

photographing means for photographing said object to be measured from two or more different viewpoints to obtain a plurality of image data;

measuring point setting means for setting, on said image photographed by said photographing means, a measuring point sequence along a curve to be measured;

curved surface calculating means for setting parabolic half-lines directed from a predetermined reference point at a photographing position of said object to be measured by said photographing means toward each said measuring point sequence set by said measuring point setting means and interpolating a group of half-lines to obtain a curved surface;

intersection calculating means for obtaining an intersection of the plurality of said curved surfaces obtained by said curved surface calculating means; and intersection length calculating means for obtaining a length of said intersection obtained by the processing by said intersection calculating means, wherein when two kinds of image data of said object to be measured is obtained from different viewpoints by said photographing means, and when a predetermined point of intersection is made by an intersection between a predetermined one of said half-lines extending from said reference point of said photographing means at the time of acquisition of the first image data and a predetermined partial curved surface, which is a part divided by said half-lines adjacent to each other among said curved surfaces obtained by the interpolation of said half-lines extending from said reference point of said photographing device at the time of acquisition of the second image data, said intersection calculating means, as the processing of obtaining a point of intersection subsequent to the intersection point in question, determines whether, among said half-lines corresponding to said first image data, a half-line subsequent to said predetermined half-line intersects with said predetermined partial curved surface, when the half-line intersects with said predetermined partial curved surface, regards the point of intersection in question as an intersection point, when the half-line fails to intersect with said predetermined partial curved surface, determines whether among said half-lines corresponding to said second image data and out of said half-lines forming said predetermined partial curved surface, said half-line whose order of said intersection determination and intersection point generation processing is lower intersects with a partial curved surface formed by said predetermined half-line and the subsequent one of said half-lines among said curved surfaces obtained by the interpolation of said half-lines extending from said reference point of said photographing device at the time of acquisition of said first image data, and when said half-line intersects with the partial curved surface, regards the point of intersection in question as an intersection point.

2. A curve length measuring device for processing image data obtained by photographing an object to be measured to measure a length of an arbitrary curve on a surface of the object to be measured, comprising:

photographing means for photographing said object to be measured from two or more different viewpoints to obtain a plurality of image data;

measuring point setting means for setting, on said image photographed by said photographing means, a measuring point sequence along a curve to be measured;

curved surface calculating means for setting parabolic half-lines directed from a predetermined reference point at a photographing position of said object to be measured by said photographing means toward each said measuring point sequence set by said measuring point setting means and interpolating a group of half-lines to obtain a curved surface;

intersection calculating means for obtaining an intersection of the plurality of said curved surfaces obtained by said curved surface calculating means; and intersection length calculating means for obtaining a length of said intersection obtained by the processing by said intersection calculating means, wherein when two kinds of image data of said object to be measured is obtained from different viewpoints by said photographing means, and when a predetermined point of intersection is made by an intersection between a predetermined one of said half-lines extending from said reference point of said photographing means at the time of acquisition of the first image data and a predetermined partial curved surface, which is a part divided by said half-lines adjacent to each other among said curved surfaces obtained by the interpolation of said half-lines extending from said reference point of said photographing device at the time of acquisition of the second image data, said intersection calculating means, as the processing of obtaining a point of intersection subsequent to the intersection point in question, determines whether, among said half-lines corresponding to said first image data, a half-line subsequent to said predetermined half-line intersects with said predetermined partial curved surface, when the half-line intersects with said predetermined partial curved surface, regards the point of intersection in question as an intersection point, when the half-line fails to intersect with said predetermined partial curved surface, determines whether among said half-lines corresponding to said second image data and out of said half-lines forming said predetermined partial curved surface, said half-line whose order of said intersection determination and intersection point generation processing is lower intersects with a partial curved surface formed by said predetermined half-line and the subsequent one of said half-lines among said curved surfaces obtained by the interpolation of said half-lines extending from said reference point of said photographing device at the time of acquisition of said first image data, when said half-line intersects with the partial curved surface, regards the point of intersection in question as an intersection point, repeatedly executes each of the foregoing processing until reaching said half-line at the other edge of said curved surface, and links an obtained sequence of intersection points to generate an intersection after reaching said half-line at the other edge of said curved surface.

3. A curve length measuring method of processing image data obtained by photographing an object to be measured to measure a length of an arbitrary curve on a surface of the object to be measured, comprising the steps of:

photographing said object to be measured from two or more different viewpoints to obtain a plurality of image data;

setting, on said image photographed, a measuring point sequence along a curve to be measured;

setting parabolic half-lines directed from a predetermined reference point at a photographing position of said image of said object to be measured toward each said measuring point sequence;

interpolating said group of half-lines to obtain a curved surface;

obtaining an intersection of the obtained plurality of said curved surfaces; and obtaining a length of said intersection obtained, wherein when obtaining two kinds of image data of said object to be measured from different viewpoints, when a predetermined point of intersection is made by an intersection between a predetermined one of said half-lines extending from said reference point of said photographing means at the time of acquisition of the first image data and a predetermined partial curved surface, which is a part divided by said half-lines adjacent to each other among said curved surfaces obtained by the interpolation of said half-lines extending from said reference point of the photographing position at the time of acquisition of the second image data, said intersection obtaining step further comprises the steps of, as the processing of obtaining a point of intersection subsequent to the intersection point in question:

determining whether, among said half-lines corresponding to said first image data, said half-line subsequent to said predetermined half-line intersects with said predetermined partial curved surface, when said half-line intersects with said predetermined partial curved surface, regarding the point of intersection in question as an intersection point, when said half-line fails to intersect with said predetermined partial curved surface, determining whether among said half-lines corresponding to said second image data and out of said half-lines forming said predetermined partial curved surface, said half-line whose order of said intersection determination and intersection point generation processing is lower intersects with a partial curved surface formed by said predetermined half-line and the subsequent one of said half-lines among said curved surfaces obtained by the interpolation of said half-lines extending from said reference point of the photographing position at the time of acquisition of said first image data, and when said half-line intersects with the partial curved surface, regarding the point of intersection in question as an intersection point.

4. A curve length measuring method of processing image data obtained by photographing an object to be measured to measure a length of an arbitrary curve on a surface of the object to be measured, comprising the steps of:

photographing said object to be measured from two or more different viewpoints to obtain a plurality of image data;

setting, on said image photographed, a measuring point sequence along a curve to be measured;

setting parabolic half-lines directed from a predetermined reference point at a photographing position of said image of said object to be measured toward each said measuring point sequence;

interpolating said group of half-lines to obtain a curved surface;

obtaining an intersection of the obtained plurality of said curved surfaces; and obtaining a length of said intersection obtained, wherein when obtaining two kinds of image data of said object to be measured from different viewpoints, when a predetermined point of intersection is made by an intersection between a predetermined one of said half-lines extending from said reference point of said photographing means at the time of acquisition of the first image data and a predetermined partial curved surface, which is a part divided by said half-lines adjacent to each other among said curved surfaces obtained by the interpolation of said half-lines extending from said reference point of the photographing position at the time of acquisition of the second image data, said intersection obtaining step further comprises the steps of, as the processing of obtaining a point of intersection subsequent to the intersection point in question:

determining whether, among said half-lines corresponding to said first image data, said half-line subsequent to said predetermined half-line intersects with said predetermined partial curved surface, when said half-line intersects with said predetermined partial curved surface, regarding the point of intersection in question as an intersection point, when said half-line fails to intersect with said predetermined partial curved surface, determining whether among said half-lines corresponding to said second image data and out of said half-lines forming said predetermined partial curved surface, said half-line whose order of said intersection determination and intersection point generation processing is lower intersects with a partial curved surface formed by said predetermined half-line and the subsequent one of said half-lines among said curved surfaces obtained by the interpolation of said half-lines extending from said reference point of the photographing position at the time of acquisition of said first image data, when said half-line intersects with the partial curved surface, regarding the point of intersection in question as an intersection point, repeatedly executing each of the foregoing processing until reaching said half-line at the other edge of said curved surface, and linking an obtained sequence of intersection points to generate an intersection after reaching said half-line at the other edge of said curved surface.

5. A computer readable memory storing a control program for controlling a data processing device to process image data obtained by the photographing of an object to be measured and measure a length of an arbitrary curve on a surface of the object to be measured, said control program comprises the functions of:

photographing said object to be measured from two or more different viewpoints to obtain a plurality of image data;

setting, on said image photographed, a measuring point sequence along a curve to be measured;

setting parabolic half-lines directed from a predetermined reference point at a photographing position of said image of said object to be measured toward each said measuring point sequence;

interpolating said group of half-lines to obtain a curved surface;

obtaining an intersection of the obtained plurality of said curved surfaces; and obtaining a length of said intersection obtained, wherein when obtaining two kinds of image data of said object to be measured from different viewpoints, when a predetermined point of intersection is made by an intersection between a predetermined one of said half-lines extending from said reference point of said photographing means at the time of acquisition of the first image data and a predetermined partial curved surface, which is a part divided by said half-lines adjacent to each other among said curved surfaces obtained by the interpolation of said half-lines extending from said reference point of the photographing position at the time of acquisition of the second image data, said intersection obtaining function of said control program further comprises the functions of, as the processing of obtaining a point of intersection subsequent to the intersection point in question:

determining whether, among said half-lines corresponding to said first image data, said half-line subsequent to said predetermined half-line intersects with said predetermined partial curved surface, when said half-line intersects with said predetermined partial curved surface, regarding the point of intersection in question as an intersection point, when said half-line fails to intersect with said predetermined partial curved surface, determining whether among said half-lines corresponding to said second image data and out of said half-lines forming said predetermined partial curved surface, said half-line whose order of said intersection determination and intersection point generation processing is lower intersects with a partial curved surface formed by said predetermined half-line and the subsequent one of said half-lines among said curved surfaces obtained by the interpolation of said half-lines extending from said reference point of the photographing position at the time of acquisition of said first image data, and when said half-line intersects with the partial curved surface, regarding the point of intersection in question as an intersection point.

6. A computer readable memory storing a control program for controlling a data processing device to process image data obtained by the photographing of an object to be measured and measure a length of an arbitrary curve on a surface of the object to be measured, said control program comprises the functions of:

photographing said object to be measured from two or more different viewpoints to obtain a plurality of image data;

setting, on said image photographed, a measuring point sequence along a curve to be measured;

setting parabolic half-lines directed from a predetermined reference point at a photographing position of said image of said object to be measured toward each said measuring point sequence;

interpolating said group of half-lines to obtain a curved surface;

obtaining an intersection of the obtained plurality of said curved surfaces; and obtaining a length of said intersection obtained, wherein when obtaining two kinds of image data of said object to be measured from different viewpoints, when a predetermined point of intersection is made by an intersection between a predetermined one of said half-lines extending from said reference point of said photographing means at the time of acquisition of the first image data and a predetermined partial curved surface, which is a part divided by said half-lines adjacent to each other among said curved surfaces obtained by the interpolation of said half-lines extending from said reference point of the photographing position at the time of acquisition of the second image data, said intersection obtaining function of said control program further comprises the functions of, as the processing of obtaining a point of intersection subsequent to the intersection point in question:

determining whether, among said half-lines corresponding to said first image data, said half-line subsequent to said predetermined half-line intersects with said predetermined partial curved surface, when said half-line intersects with said predetermined partial curved surface, regarding the point of intersection in question as an intersection point, when said half-line fails to intersect with said predetermined partial curved surface, determining whether among said half-lines corresponding to said second image data and out of said half-lines forming said predetermined partial curved surface, said half-line whose order of said intersection determination and intersection point generation processing is lower intersects with a partial curved surface formed by said predetermined half-line and the subsequent one of said half-lines among said curved surfaces obtained by the interpolation of said half-lines extending from said reference point of the photographing position at the time of acquisition of said first image data, when said half-line intersects with the partial curved surface, regarding the point of intersection in question as an intersection point, repeatedly executing each of the foregoing processing until reaching said half-line at the other edge of said curved surface, and linking an obtained sequence of intersection points to generate an intersection after reaching said half-line at the other edge of said curved surface.

* * * * *